US009838587B2

United States Patent
Kim et al.

(10) Patent No.: US 9,838,587 B2
(45) Date of Patent: Dec. 5, 2017

(54) SYSTEM FOR REGISTRATION OF VIRTUAL SPACE AND REAL SPACE, METHOD FOR REGISTERING DISPLAY APPARATUS AND IMAGE SENSOR, AND ELECTRONIC DEVICE REGISTERED USING THE METHOD

(71) Applicant: CENTER OF HUMAN-CENTERED INTERACTION FOR COEXISTENCE, Seoul (KR)

(72) Inventors: Young-Yong Kim, Seoul (KR); Junsik Kim, Seoul (KR); Jung Min Park, Seoul (KR)

(73) Assignee: Center of Human-centered Interaction for Coexistence, Seoul (KR)

( * ) Notice: Subject to any disclaimer, the term of this patent is extended or adjusted under 35 U.S.C. 154(b) by 0 days.

(21) Appl. No.: 15/180,904

(22) Filed: Jun. 13, 2016

(65) Prior Publication Data

US 2016/0371889 A1    Dec. 22, 2016

(30) Foreign Application Priority Data

Jun. 22, 2015  (KR) .................. 10-2015-0088254

(51) Int. Cl.
*G09G 5/14* (2006.01)
*H04N 5/232* (2006.01)
(Continued)

(52) U.S. Cl.
CPC .......... *H04N 5/232* (2013.01); *G06F 3/1423* (2013.01); *H04N 17/002* (2013.01); *G09G 2370/16* (2013.01)

(58) Field of Classification Search
CPC ....................................... H04N 5/232
(Continued)

(56) References Cited

U.S. PATENT DOCUMENTS 6,527,395 B1    3/2003  Raskar et al.
7,321,839 B2 *  1/2008  Maeda ............... H04N 13/0246
                                                        348/E13.016
(Continued)

FOREIGN PATENT DOCUMENTS

JP           5453352 B2       3/2014
KR    10-2013-0028878 A       3/2013
(Continued)

OTHER PUBLICATIONS

Zhang, Zhengyou. "Flexible Camera Calibration by Viewing a Plane From Unknown Orientations." Computer Vision, 1999. The Proceedings of the Seventh IEEE International Conference on. vol. 1. IEEE, 1999 (8 pages).

(Continued)

*Primary Examiner* — Javid A Amini
(74) *Attorney, Agent, or Firm* — NSIP Law

(57)    ABSTRACT

A space registration system includes a display apparatus, an image sensor, a processor, and a plane mirror. The display apparatus has an inherent display coordinate system which defines a coordinate of the virtual space. The image sensor has an inherent sensor coordinate system which defines a coordinate of the real space. The processor analogizes a transformation equation of the sensor coordinate system and the display coordinate system by means of symmetry of an incidence angle and a reflection angle of light with respect to the mirror surface, compares a coordinate of the reflection image with respect to the display coordinate system with a known coordinate of the reflection image with respect to the sensor coordinate system, and adjusts the transformation equation of the sensor coordinate system and the display coordinate system.

15 Claims, 4 Drawing Sheets

(51) Int. Cl.
*G06F 3/14* (2006.01)
*H04N 17/00* (2006.01)

(58) Field of Classification Search
USPC .......................................................... 345/633
See application file for complete search history.

(56) References Cited

U.S. PATENT DOCUMENTS

| | | | |
|---|---|---|---|
| 8,390,677 B1* | 3/2013 | Said | H04N 13/0404 348/46 |
| 8,938,131 B1* | 1/2015 | Kim | G06F 3/0346 382/293 |
| 2007/0115361 A1* | 5/2007 | Bolas | H04N 5/74 348/189 |
| 2013/0063560 A1 | 3/2013 | Roberts et al. | |
| 2014/0218472 A1 | 8/2014 | Kim et al. | |

FOREIGN PATENT DOCUMENTS

| | | |
|---|---|---|
| KR | 10-2014-0100289 A | 8/2014 |
| KR | 10-1496441 B1 | 2/2015 |
| KR | 10-2015-0040580 A | 4/2015 |

OTHER PUBLICATIONS

Kumar, Ram Krishan, et al. "Simple Calibration of Non-Overlapping Cameras with a Mirror." Computer Vision and Pattern Recognition, 2008. CVPR, IEEE, 2008 (7 pages).
Kim, Jun-Sik, et al. "Sensor-Display Registration for 3D Physical User Interaction Using a Flat-Panel Display." 22nd International Conference on Pattern Recognition (ICPR), IEEE, 2014 (1675-1680).

* cited by examiner

SYSTEM FOR REGISTRATION OF VIRTUAL SPACE AND REAL SPACE, METHOD FOR REGISTERING DISPLAY APPARATUS AND IMAGE SENSOR, AND ELECTRONIC DEVICE REGISTERED USING THE METHOD

CROSS-REFERENCE TO RELATED APPLICATION

This application claims priority to Korean Patent Application No. 20105-0088254, filed on Jun. 22, 2015, and all the benefits accruing therefrom under 35 U.S.C. §119, the contents of which in its entirety are herein incorporated by reference.

BACKGROUND

1. Field

The present disclosure relates to a system for registration of a virtual space and a real space, and more particularly, to a system for registration of a virtual space formed by a display apparatus and a real space photographed by an image sensor, and a method for registering the display apparatus and the image sensor.

[Description about National Research and Development Support]

This study was supported by the Global Frontier Project of Ministry of Science, ICT and Future Planning, Republic of Korea (Project No. 1711017223) under the superintendence of National Research Foundation of Korea.

2. Description of the Related Art

As devices such as smart phones and smart TV are being propagated widely, a user interface based on a motion of a user is actively studied.

In order to input data using an existing user interface based on a user motion, a user may directly touch a screen with the finger, which is called a touch-type sensing method, and information obtained using an image sensor such as a camera sensor may be used without touching a screen with the finger, which is called a non-touch sensing method.

In relation to the non-touch sensing method, in order to provide a more realistic interface environment to the user on a three-dimensional display apparatus, a method for giving a kind of "optical illusion effect" as if the user directly touches the image has been studied in various ways.

In order to give such an optical illusion effect, it is demanded that a display apparatus and an image sensor are registered with each other. For example, in an existing registering method, an image output on the screen of a display apparatus is observed together with a user by using an image sensor and corrected suitable for the user.

However, an existing image sensor provided at a smart phone or a smart TV presently used is disposed in the same direction as the screen of the display apparatus so that a user or an object facing the screen may be observed. Therefore, in a device environment where an image sensor is not able to directly observe an image on the screen, the existing registering method may not be easily applied.

Meanwhile, in case of a virtual space user interface device based on a physical law using a three-dimensional flat display, a location-oriented relationship should exist between a virtual space and a real space where the user exists. Therefore, it is important to not only to simply figure out a motion of a user but also figure out a location and motion of each portion of a user body and then accurately apply the location and motion of each portion to a virtual space.

However, in the existing registering method, even though it has been attempted to figure out a transformation relation between locations at a virtual space and a real space and register the display apparatus and the image sensor, significant errors have occurred during this process.

SUMMARY

The present disclosure is designed to register a virtual space and a real space, and the present disclosure is directed to providing a method for registering a virtual space and a real space, which may estimate a location relation between a virtual space formed by at least one display apparatus and a real space photographed by at least one image sensor and adjust the image to minimize an error between the estimated result and the actual value, and an electronic device registered using the method.

Objects of the present disclosure are not limited to the above, and other objects not mentioned herein will be clearly understood from the following disclosure by those having ordinary skill in the art.

According to an embodiment of the present disclosure, there is provided a space registration system for registration of a virtual space and a real space, the system comprising: a display apparatus configured to output an image on a screen to form a virtual space; an image sensor disposed at a location where the image output on the screen is not directly observed, to observe a real space facing the screen; a processor configured to control the display apparatus and the image sensor; and a plane mirror disposed so that an image output on the screen ("display image") is reflected to a mirror surface and the display image reflected to the mirror surface ("reflection image") is photographed by the image sensor. The display apparatus has an inherent display coordinate system which defines a coordinate of the virtual space, and the image sensor has an inherent sensor coordinate system which defines a coordinate of the real space. The processor analogizes a transformation equation of the sensor coordinate system and the display coordinate system by means of symmetry of an incidence angle and a reflection angle of light with respect to the mirror surface, and calculates a coordinate of the reflection image with respect to the display coordinate system. The processor transforms the coordinate of the reflection image with respect to the display coordinate system into a coordinate with respect to the sensor coordinate system ("comparison coordinate") by means of the analogized transformation equation. The processor compares the comparison coordinate with the known coordinate of the reflection image with respect to the sensor coordinate system ("reference coordinate"), and adjusts the transformation equation of the sensor coordinate system and the display coordinate system to minimize an error thereof.

According to another embodiment of the present disclosure, the system may comprise: d number of display apparatuses (d>1) configured to output an image on a screen to form a virtual space; c number of image sensors (c>1) configured to observe a real space facing the screen; a processor configured to control the d number of display apparatuses and the c number of image sensors; and a plane mirror disposed so that an image output to the screen of an $i^{th}$ display apparatus ($i^{th}$ display image) (i is an integer of 1 to d) among the d number of display apparatuses is reflected to the mirror surface, and the $i^{th}$ display image reflected to the mirror surface ($i^{th}$ reflection image) is photographed by a $j^{th}$ image sensor (j is an integer of 1 to c) among the c number of image sensors. The $i^{th}$ display apparatus may have an inherent $i^{th}$ display coordinate system which defines a coordinate of the virtual space, and the $j^{th}$ image sensor may have an inherent $j^{th}$ sensor coordinate system which defines a coordinate of the real space. The processor may analogize a transformation equation of the $i^{th}$ display coordinate system and the $j^{th}$ sensor coordinate system by means of symmetry of an incidence angle and a reflection angle of light with respect to the mirror surface, and calculate a coordinate of the $i^{th}$ reflection image with respect to the $i^{th}$ display coordinate system. The coordinate of the $i^{th}$ reflection image with respect to the $i^{th}$ display coordinate system may be transformed into a coordinate with respect to the $j^{th}$ sensor coordinate system ("i-j comparison coordinate $(p'_{ij})$") by means of the analogized transformation equation, and in an equation $\Sigma_{i=0}^{D}\Sigma_{j=0}^{C}[p_{ij}-p'_{ij}]^2$, the i-j comparison coordinate $(p'_{ij})$ may be compared with the known coordinate of the $i^{th}$ reflection image with respect to the $j^{th}$ sensor coordinate system ("i-j reference coordinate $(p_{ij})$"), and the transformation equation of the $i^{th}$ display coordinate system and the $j^{th}$ sensor coordinate system may be adjusted to minimize a difference thereof.

According to an embodiment of the present disclosure, in the above equation, the processor may compare the i-j comparison coordinate $(p'_{ij})$ with the i-j reference coordinate $(p_{ij})$, and adjust a transformation equation between display coordinate systems of the d number of display apparatuses (for example, a transformation equation between an $i^{th}$ display coordinate system and an $i+1^{th}$ display coordinate system) to minimize a difference thereof.

According to an embodiment of the present disclosure, in the above equation, the processor may compare the i-j comparison coordinate $(p'_{ij})$ with the i-j reference coordinate $(p_{ij})$, and adjust a transformation equation between sensor coordinate systems of the c number of image sensors (for example, a transformation equation between a $j^{th}$ sensor coordinate system and a $j+1^{th}$ sensor coordinate system) to minimize a difference thereof.

According to another embodiment of the present disclosure, there is provided a space registration method for registering a display coordinate system and a sensor coordinate system, which comprises (a) outputting an image on the screen of the display apparatus ("display image"); (b) disposing a plane mirror at a predetermined location with a predetermined angle within a range which is capable of being photographed by the image sensor; (c) by the image sensor, photographing the display image reflected to a mirror surface of the plane mirror ("reflection image"); (d) analogizing a transformation equation of the sensor coordinate system and the display coordinate system by means of symmetry of an incidence angle and a reflection angle of light with respect to the mirror surface, and calculating a coordinate of the reflection image with respect to the display coordinate system; (e) transforming the coordinate of the reflection image with respect to the display coordinate system into a coordinate with respect to the sensor coordinate system ("comparison coordinate") by means of the analogized transformation equation; and (f) comparing the comparison coordinate with the known coordinate of the reflection image with respect to the sensor coordinate system ("reference coordinate"), and adjusting the transformation equation of the sensor coordinate system and the display coordinate system to minimize an error thereof.

According to another embodiment of the present disclosure, the electronic device may include d number of display apparatuses (d>1) configured to output an image on a screen to form a virtual space, and c number of image sensors (c>1) disposed at a location where the image output on the screen is not directly observed, to observe a real space facing the screen, wherein among the d number of display apparatuses, an $i^{th}$ display apparatus (i is an integer of 1 to d) may have an inherent $i^{th}$ display coordinate system which defines a coordinate of the virtual space, and among the c number of image sensors, a $j^{th}$ image sensor has an inherent $j^{th}$ sensor coordinate system which defines a coordinate of the real space, the method comprising: (a) outputting an image ("$i^{th}$ display image") on the screen of the $i^{th}$ display apparatus; (b) disposing the plane mirror at a predetermined location with a predetermined angle within a range which is capable of being photographed by the $j^{th}$ image sensor; (c), by the $j^{th}$ image sensor, photographing the $i^{th}$ display image reflected to the mirror surface of the plane mirror ("$i^{th}$ reflection image"); the steps (a) to (c) being performed by the d number of display apparatuses and the c number of image sensors, respectively, (d) analogizing a transformation equation of the $j^{th}$ sensor coordinate system and the $i^{th}$ display coordinate system, and calculating a coordinate of the $i^{th}$ reflection image with respect to the $i^{th}$ display coordinate system; (e) transforming the coordinate of the $i^{th}$ the reflection image with respect to the $i^{th}$ display coordinate system into a coordinate with respect to the $j^{th}$ sensor coordinate system ("i-j comparison coordinate $(p'_{ij})$") by means of the analogized transformation equation, and (f) comparing the i-j comparison coordinate $(p'_{ij})$ with the known coordinate of the $i^{th}$ reflection image with respect to the $j^{th}$ sensor coordinate system ("i-j reference coordinate $(p_{ij})$"), and adjusting a transformation equation of the $i^{th}$ display coordinate system and the $j^{th}$ sensor coordinate system to minimize a difference thereof in an equation $\Sigma_{i=0}^{D}\Sigma_{j=0}^{C}[p_{ij}-p'_{ij}]^2$.

According to an embodiment of the present disclosure, the step (f) may include comparing the i-j comparison coordinate $(p'_{ij})$ with the i-j reference coordinate $(p_{ij})$, and adjusting a transformation equation between sensor coordinate systems of the c number of image sensors (for example, a transformation equation between a $j^{th}$ sensor coordinate system and a $j+1^{th}$ sensor coordinate system) to minimize a difference thereof in the equation.

According to an embodiment of the present disclosure, the step (f) may include comparing the i-j comparison coordinate $(p'_{ij})$ with the i-j reference coordinate $(p_{ij})$, and adjusting a transformation equation between display coordinate systems of the d number of display apparatuses (for example, a transformation equation between an $i^{th}$ display coordinate system and an $i+1^{th}$ display coordinate system) to minimize a difference thereof in the equation.

According to an embodiment of the present disclosure, the step (c) may be performed by simultaneously photographing d number of reflection images, respectively formed by the d number of display apparatuses, by means of the $j^{th}$ image sensor.

According to an embodiment of the present disclosure, the step (f) may be performed by adjusting a transformation equation of the first display coordinate system and the $j^{th}$ sensor coordinate system and a transformation equation of the first display coordinate system and the $i^{th}$ display coordinate system, on the basis of the first display coordinate system.

According to an embodiment of the present disclosure, the display image may have a lattice pattern.

According to another embodiment of the present disclosure, there is provided an electronic device, comprising: a display apparatus configured to output an image on a screen to form a virtual space; and an image sensor disposed at a location where the image output on the screen is not directly observed, to observe a real space facing the screen, wherein the display coordinate system and the sensor coordinate system are registered by means of the space registration method according to the above.

According to an embodiment of the present disclosure, the image sensor may be fixed and coupled to the display apparatus.

According to an embodiment of the present disclosure, the display apparatus may be a three-dimensional display apparatus capable of outputting a three-dimensional image.

According to an embodiment of the present disclosure, the image sensor may be a RGBD sensor.

DETAILED DESCRIPTION

Advantages and features of the present disclosure and their solutions will be more apparent from the following detailed description and embodiments taken in conjunction with the accompanying drawings. However, the present disclosure is not limited to the embodiments disclosed below but may be implemented in various ways, and the embodiments are just for more perfect disclosure and better understanding to those having ordinary skilled in the art. The present disclosure is defined just by the scope of the appended claims.

Even though the terms "first", "second", and the like are used for describing various components, the components are not limited to the terms. These terms are just used for distinguishing one component from another. Therefore, a first component mentioned herein may also be used as a second component within the scope of the present disclosure.

Features of various embodiments of the present disclosure may be coupled to or combined with each other partially or wholly and may be technically linked and operated in various ways as being easily understood by those having ordinary skill in the art. In addition, embodiments may be implemented independently or associated together.

Figure 1:
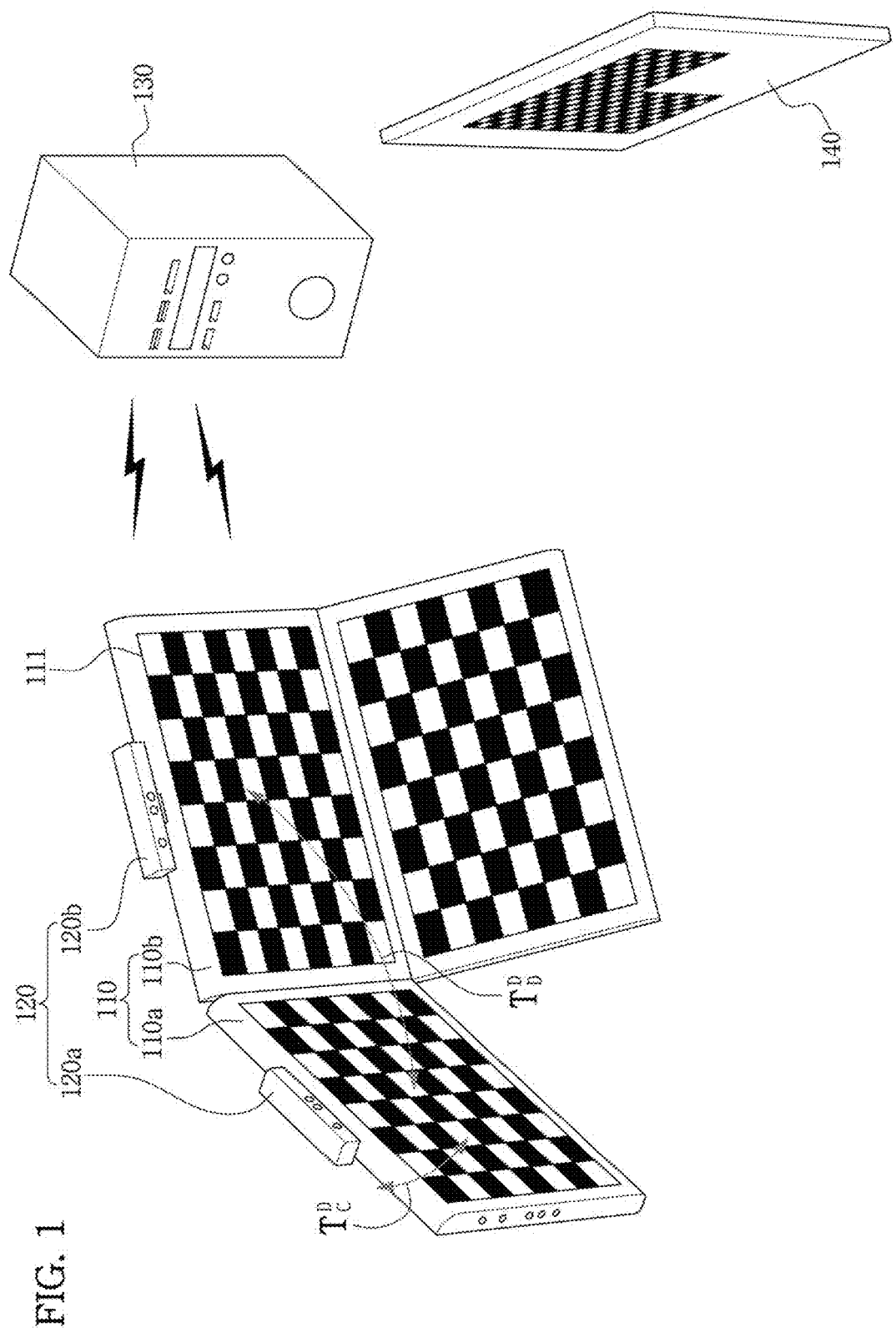
FIG. 1 is a schematic view showing a space registration system according to an embodiment of the present disclosure.

Referring to FIG. 1, a system 10 for registration of a virtual space and a real space (hereinafter, also referred to as a space registration system) includes a display apparatus 110, an image sensor 120, a processor 130, and a plane mirror 140.

The display apparatus 110 has a screen 111 for outputting an image. The display apparatus 110 outputs an image (hereinafter, referred to as a "display image") on the screen 111 to form a virtual space. The display image may be an image for a three-dimensional virtual space which may give a cubic effect to a user. For example, the display apparatus 110 may output a three-dimensional image by means of a stereoscopic method, an auto-stereoscopic method or the like.

The display apparatus 110 has an inherent display coordinate system which defines a coordinate of the virtual space. In other words, the display image includes coordinate information on the display coordinate system which is used as a reference for processing information. The coordinate information may be coordinate information corresponding to each pixel on the screen 111 or coordinate information on the virtual space formed corresponding to each pixel of the display image.

The space registration system 10 may include a plurality of display apparatuses 110. The virtual space may be formed by each display image output from each of the plurality of display apparatuses 110. For example, a first virtual space is formed by a first display image of a first display apparatus 110a, a second virtual space is formed by a second display image of a second display apparatus 110b, and the first virtual space and the second virtual space may configure a single whole virtual space. As the plurality of display apparatuses 110 are used as described above, a work space of a user in a virtual environment may be expanded.

The plurality of display apparatuses 110 may individually have an inherent display coordinate system which defines a coordinate of the virtual space. In other words, each display image output from the plurality of display apparatuses 110 may have a display coordinate system, respectively, and coordinate information may be included on each display coordinate system. For example, the first display image output from the first display apparatus 110a may include coordinate information on the first display coordinate system, and the second display image output from the second display apparatus 110b may include coordinate information on the second display coordinate system. Each display coordinate system varies depending on an angle at which the screen 111 is aligned and a location at which the display apparatus 110 is disposed.

In order to form a single whole virtual space by means of the plurality of display apparatuses 110, coordinate information of the virtual space respectively formed by the display apparatuses 110 may be integrated into a single coordinate system. By doing so, it is possible to prevent that display images at the same location are distorted as if they are at different locations or a location relation of the display images is changed. For this, a transformation relation of display coordinate systems may be obtained so that a relation of coordinate information on each virtual space may be figured out, as described later in detail.

The image sensor 120 is a camera-type sensor and photographs a real space, or a user or an object on the real space. The image sensor 120 is disposed at a location where the image output on the screen 111 is not directly observed, and photographs a real space facing the screen 111. The image sensor 120 may not only obtain an image from the real space but also figure out a distance to a light source or a reflection body which generates the image at a corresponding pixel in the real space. The image sensor 120 may employ a RGBD sensor such as Kinect produced by Microsoft or XtionPro produced by ASUS.

The image sensor 120 has an inherent sensor coordinate system which defines a coordinate of the real space. In other words, the image of the real space generated by photographing the real space by means of the image sensor 120 includes coordinate information on the sensor coordinate system which is a reference for processing information. The coordinate information included in the image of the real space may be location information in the real space photographed with respect to each pixel of the image at any reference location on the sensor coordinate system.

Meanwhile, the space registration system 10 may include a plurality of image sensors 120. At this time, the image of the real space is generated by each of the plurality of image sensors 120. For example, an image for a single real space may be generated by a first image sensor 120a, and another image for the real space may be generated by a second image sensor 120b. By using the plurality of image sensors 120 as described above, the real space may be observed more broadly in more detail, and interactions with the plurality of display apparatuses 110 may be maximized.

The plurality of image sensors 120 may respectively have a sensor coordinate system which defines a coordinate of the real space. In addition, images of the real space, respectively generated by the plurality of image sensors 120, may include coordinate information on each sensor coordinate system. For example, the image of the real space generated by the first image sensor 120a may include coordinate information on a first sensor coordinate system, and another image generated by the second image sensor 120b may include coordinate information on a second sensor coordinate system. Each sensor coordinate system varies depending on a location where each of the plurality of image sensors 120 is disposed and a photographing angle thereof.

If a plurality of images for the real space are generated by means of the plurality of image sensors 120, coordinate information included in the images may be integrated into a single coordinate system. In other words, even though the image sensors 120 photograph with different angles or different distances, by checking a relation of coordinate information of images corresponding to the same location on the real space, the real space may be figured out more accurately. For this, it is required to obtain a transformation relation between sensor coordinate systems of the image sensor 120, and this will be described later in detail.

The processor 130 controls the display apparatus 110 and the image sensor 120.

The processor 130 may send an image which is to be output to the display apparatus 110. At this time, the processor 130 may figure out coordinate information included in the sent display image. In other words, the processor 130 may figure out coordinate information of the virtual space formed by the display image, and a display coordinate system included in the coordinate information.

The processor 130 may control the image sensor 120 to photograph a real space and generate an image. In addition, the processor 130 may receive an image of the real space photographed by the image sensor 120. The processor 130 may figure out coordinate information of the real space photographed by the image sensor 120, and a sensor coordinate system included in the coordinate information from the received image.

The processor 130 may analogize a transformation equation between the display coordinate system and the sensor coordinate system which have been figured out as above. The analogizing process will be described later in detail. In addition, the processor 130 may calculate a transformation of the coordinate system including the coordinate information by means of the analogized transformation relation. For example, the processor 130 may transform the coordinate information with respect to the display coordinate system into coordinate information with respect to the sensor coordinate system by means of calculation using the transformation relation, or vice versa.

Meanwhile, the processor 130 may adjust a designated variable to minimize an error, by optimizing the designated variable in an equation for obtaining an error between two coordinates. This will be described later in detail.

The plane mirror 140 faces the screen of the display apparatus 110 and is disposed within a photographing range of the image sensor 120. The plane mirror 140 may be fixed on a support whose location and angle may be easily adjusted.

The plane mirror 140 reflects the display image output from the display apparatus 110 to the image sensor 120. The plane mirror 140 may be so broad to reflect images output from the plurality of display apparatuses 110 to the image sensor 120 at once, since this may reduce individual photographing operations of the display apparatuses 110.

In order to give a kind of "optical illusion effect" so that a user may feel as if he/she stretches his/her hand and directly touches an image, for example, it may be required to suitably correct a location or the like of the display image output to the screen 111 according to a body location of the user photographed by the image sensor 120. In detail, an eye location of a user may be photographed, and a perspective view in the image may be set on the basis of the eye location. In addition, a hand location and motion of a user may be photographed, and this may be applied to a location and motion of an object in the image.

In order to perform this operation rapidly and easily, it is required that the sensor coordinate system and the display coordinate system may be transformed into each other. In other words, by obtaining a transformation relation between the sensor coordinate system and the display coordinate system, an object of the real space may be registered in the virtual space in a 1:1 ratio to induce a physical interaction in the virtual space, and information of the virtual space may be proposed to a visual field of the user.

A method of figuring a transformation relation of the sensor coordinate system and the display coordinate system and obtaining and optimizing the transformation relation will be described below in detail.

Figure 2:
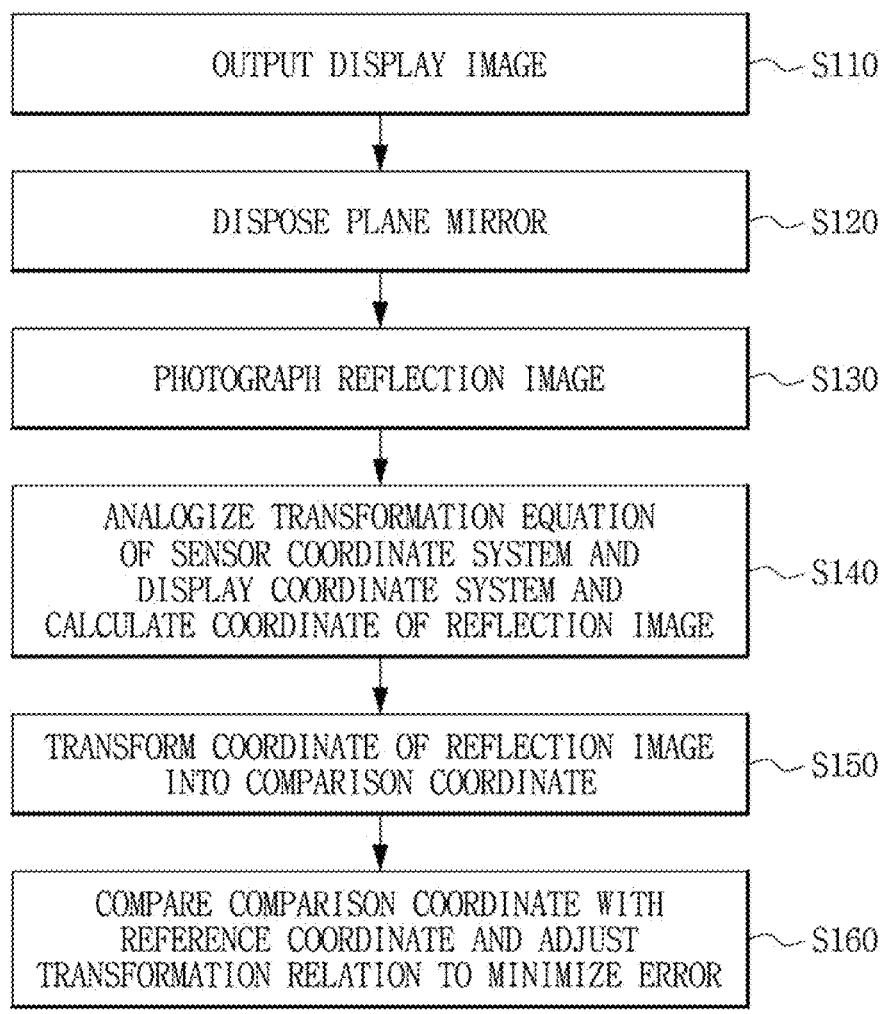
FIG. 2 is a flowchart for illustrating each step of a space registration method according to another embodiment of the present disclosure.

Referring to FIG. 2, a method for registering a virtual space and a real space according to an embodiment of the present disclosure includes outputting a display image to the screen 111 of the display apparatus 110 (S110); disposing a plane mirror 140 at a predetermined location with a predetermined angle within a range which may be photographed by the image sensor 120 (S120); by the image sensor 120, photographing the display image reflected to a mirror surface of the plane mirror 140 (hereinafter, referred to as a "reflection image") (S130); analogizing a transformation equation of the sensor coordinate system and the display coordinate system by means of symmetry of an incidence angle and a reflection angle of light with respect to the mirror surface, and calculating a coordinate of the reflection image with respect to the display coordinate system (S140); transforming the coordinate of the reflection image with respect to the display coordinate system into a coordinate with respect to the sensor coordinate system by means of the analogized transformation equation (S150); and comparing the comparison coordinate with the known coordinate of the reflection image with respect to the sensor coordinate system, and adjusting the transformation equation of the sensor coordinate system and the display coordinate system to minimize an error thereof (S160).

First, a display image is output to the screen 111 of the display apparatus 110 (S110). An image having a predetermined pattern may be output to the display apparatus 110 (S110).

The pattern of the display image may have a lattice pattern having white and black colors alternately as shown in FIG. 1. At this time, the display image include coordinate information corresponding to an intersect point of the lattice pattern. By doing so, the processor 130 may figure out the coordinate information included in the display image output from the display apparatus 110.

The plurality of display apparatuses 110 may individually output display images having a pattern, namely through each display apparatus 110a, 110b. In addition, each of the plurality of display apparatuses 110 may have an inherent display coordinate system which defines a coordinate of an intersect point on the lattice pattern. For example, the first display apparatus 110a may have a first display coordinate system, and the second display apparatus 110b may have a second display coordinate system.

The processor 130 may control the plurality of display apparatuses 110 to output display images having a pattern. In addition, coordinate information included in each display coordinate system may be figured out from each display image.

Next, the plane mirror 140 is disposed at a predetermined location with a predetermined angle within a range which may be photographed by the image sensor 120 (S120).

As shown in FIG. 1, the plane mirror 140 is disposed so that the image on the screen 111 of the display apparatus 110 may be reflected by the plane mirror 140 and photographed by the image sensor 120. By doing so, even though the image sensor 120 may not directly photograph the display image, the display image may be indirectly photographed by means of the plane mirror 140.

Meanwhile, by disposing the plane mirror 140 with a plurality of postures to have different angles and locations within a range which may be photographed by the image sensor 120, an error in the transformation relation may be further reduced during an optimizing process.

Next, by using the image sensor 120, the display image projected to the mirror surface of the plane mirror 140 is photographed (S130).

The reflection image photographed by the image sensor 120 is photographed so that its right and left sides are inverted in comparison to an image obtained by directly photographing the display image output from the display apparatus 110. In addition, due to the distance from the display apparatus 110 to the plane mirror 140 and the distance from the plane mirror 140 to the image sensor 120, the reflection image is photographed to have a smaller size in comparison to the display image output from the display apparatus 110.

In this step (S130), the processor 130 may figure out a location and angle of the plane mirror 140 by means of the photographed reflection image. In addition, the processor 130 may figure out location and angle relations of the display apparatus 110, the image sensor 120 and the plane mirror 140.

Figure 3:
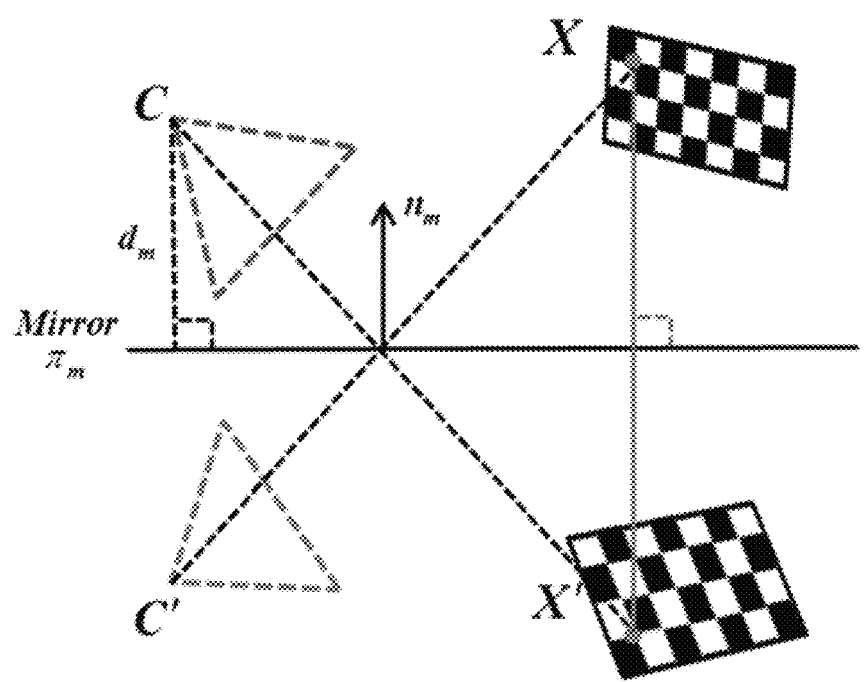
FIG. 3 is a schematic view showing the space registration system of FIG. 1.

Referring to FIG. 3, the following equation may be derived from an actual location C of the image sensor 120, a location C' of the image sensor 120 on the mirror reflected by the plane mirror 140 at the display coordinate system, a normal vector n of the mirror surface of the plane mirror 140, and a distance d between the image sensor 120 and the plane mirror 140.

$$C' + 2dn = C \quad \text{[Equation 3]}$$

Meanwhile, from Equation 3, it may be figured out that the vector C'−C is parallel to the vector n. Regarding any vector $r_k$ (k=1, 2, 3), the following equation may be derived with respect to a relation with a vector $r_k'$ reflected in a state where the incidence angle and the reflection angle are identical.

$$(C'-C)^T(r_k+r_k')=0$$

$$C'^T r_k' + C'^T r_k - C^T r_k' - s_k = 0$$

$$s_k = C^T r_k \quad \text{[Equation 4]}$$

In addition, in this step (S130), by photographing the reflection image and obtaining the coordinate information of the sensor coordinate system, it is possible to calculate $C'^T$ and $r_k'$ from the transformation relation $T_{X'}^C$ between the display coordinate system and the sensor coordinate system inverted by the plane mirror 140. At this time, $T_{X'}^C$ may be transformed into $T_{X'}^{C'}$ in consideration of the reflection by the plane mirror 140, and the following equation may be derived.

$$R_{X'}^C = [r_1' r_2' r_3']$$

$$T_{X'}^C = C' \quad \text{[Equation 5]}$$

After that, a transformation equation of the sensor coordinate system and the display coordinate system is analogized by means of symmetry of an incidence angle and a reflection angle of light with respect to the mirror surface, and a coordinate of the reflection image with respect to the display coordinate system is calculated (S140).

In this step (S140), the processor 130 obtains a linear equation from the location and angle relations of the display apparatus 110, the image sensor 120 and the plane mirror 140 and Equations 4 and 5, and from this, a transformation equation between the display coordinate system and the sensor coordinate system may be analogized. In addition, the processor 130 may obtain coordinate information of the reflection image with respect to the display coordinate system.

$$\begin{bmatrix} -r_1'^T & C'^T & 0 & 0 & -1 & 0 & 0 \\ -r_2'^T & 0 & C'^T & 0 & 0 & -1 & 0 \\ -r_3'^T & 0 & 0 & C'^T & 0 & 0 & -1 \end{bmatrix} \begin{bmatrix} C \\ r_1 \\ r_2 \\ r_3 \\ s_1 \\ s_2 \\ s_3 \end{bmatrix} = \begin{bmatrix} -C'^T r_1' \\ -C'^T r_2' \\ -C'^T r_3' \end{bmatrix} \quad \text{[Equation 6]}$$

After that, the coordinate of the reflection image with respect to the display coordinate system is transformed into a coordinate (hereinafter, referred to as a "comparison coordinate") with respect to the sensor coordinate system by means of the analogized transformation equation (S150).

Figure 4:
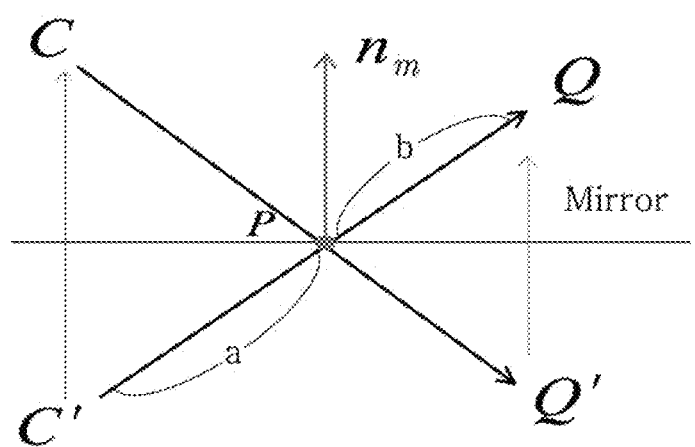
FIG. 4 is a schematic view showing the space registration system of FIG. 1.

Referring to FIG. 4, coordinate information $Q^n$ of the reflection image with respect to the display coordinate system may be transformed into a coordinate $p_m^n$ on the plane mirror 140 according to a ratio $\lambda$ of a distance a between the image sensor 120 and the plane mirror 140 to a distance b between the display apparatus 110 and the plane mirror 140. m represents each posture of the disposed plane mirror 140, and n represents each intersect point of the lattice pattern.

$$P_m^n = \frac{C_m' + \lambda_m^n Q^n}{\lambda_m^n + 1} \quad \text{[Equation 7]}$$

$$\lambda_m^n = \frac{a}{b} = \frac{n_m \cdot (C - C_m')}{n_m \cdot (2Q^n - (C + C_m'))}$$

In addition, the coordinate information $p_m^n$ on the display coordinate system may be transformed into a comparison coordinate $p_m^{fn}$ on the sensor coordinate system by using an intrinsic parameter K such as a focal distance of the image sensor 120 and the transformation relation analogized in S140.

$$p_m^{fn} = KT_D{}^C p_n{}^m \quad \text{[Equation 8]}$$

After that, the comparison coordinate is compared with a coordinate (hereinafter, referred to as a "reference coordinate") of the reflection image with respect to the sensor coordinate system, and the transformation equation of the sensor coordinate system and the display coordinate system is adjusted to minimize an error thereof (S160).

The nonlinear optimization performed in this step (S160) is to minimize a re-projection error by the plane mirror 140, and a cost function for the nonlinear optimization uses the transformation relation of the sensor coordinate system and the display coordinate system as a variable and also uses the reference coordinate $p_n{}^m$ and the coordinate information $Q^n$ of the reflection image with respect to the display coordinate system as given values. At this time, a relation equation between the reference coordinate $p_m{}^n$ and the transformed comparison coordinate $p_m'^n$ with respect to an error is as follows.

$$CostFuction = \sum_{m=0}^{M}\sum_{n=0}^{N}[p_m^n - p_m'^n]^2 \quad \text{[Equation 9]}$$

The processor 130 may obtain an optimized transformation equation by adjusting the transformation relation between the display coordinate system and the sensor coordinate system to minimize an error of Equation 9. In order to optimize variables, a Levenberg Marquardt (LM) algorithm, a gradient descent or the like may be used.

In case of the plurality of display apparatuses 110 and the plurality of image sensors 120, the above steps (S110 to S130) may be individually performed by each of the plurality of image sensors 120 with respect to each of the plurality of display apparatuses 110, to figure out a location and angle relation of each display apparatus 110, each image sensor 120 and the plane mirror 140.

In addition, Equation 9 may be expanded into a following equation with respect to the plurality of display apparatuses 110 and the plurality of image sensors 120.

$$CostFuction = \sum_{i=0}^{D}\sum_{j=0}^{C}\sum_{m=0}^{M}\sum_{n=0}^{N}[p_{ijm}^n - p_{ijm}'^m]^2 \quad \text{[Equation 10]}$$

In Equation 10, i and j represent an individual display apparatus 110 and an individual image sensor 120, respectively.

At this time, relations among variables included in Equation 10 are as follows.

$$T_{C_i}^{D_{ref}} \Rightarrow C_{refj}$$

$$T_{C_s}^{C_j} T_{D'_{refm}}^{C_s} \Rightarrow T_{C'_{im}}^{D_{ref}} \Rightarrow C'_{refjm}$$

$$T_{D_{ref}}^{D_i} C_{refj} \Rightarrow C_{ij}$$

$$T_{D_{ref}}^{D_i} C'_{refjm} \Rightarrow C'_{ijm} \quad \text{[Equation 11]}$$

In Equation 11, a coordinate system included in any one display apparatus 110 is set as a reference coordinate system.

Seeing Equation 11, it may be understood that not only a transformation relation $T_{C_i}^{D_{ref}}$ between the reference display coordinate system analogized in S140 and any one sensor coordinate system but also (1) a transformation relation $T_{C_i}^{D_{ref}}$ between the reference display coordinate system and other sensor coordinate systems, (2) a transformation relation $T_{C_2}^{C_j}$ between the sensor coordinate systems, and (3) a transformation relation $T_{D_{ref}}^{D_i}$ between the display coordinate systems may be included as variables in Equation 11.

The S160 may be performed using the location and angle relations of each display apparatus 110, each image sensor 120 and the plane mirror 140 as well as the transformation relations of Equation 11, to optimize each transformation relation.

As described above, variables in relation to each transformation relation included in Equation 10 may be obtained more accurately by means of the adjustment process for minimizing an error. In addition, since the variables are optimized on a single equation without being individually obtained, the transformation relation may be obtained more accurately in an intuitive way.

If the space registration method according to an embodiment of the present disclosure as described above is used, a transformation relation between a plurality of display coordinate systems and a plurality of sensor coordinate systems may be figured out more accurately, and a transformation relation between sensor coordinate systems and a transformation relation between display coordinate systems may be indirectly obtained. Therefore, an optimized transformation relation may be obtained more accurately and more easily in comparison to an existing method which has deteriorated accuracy and complicated processes since relations are individually obtained and then integrated.

By doing so, since location information in a real space and location information in a virtual space are integrally processed from a single reference coordinate system to be transformable into each other, a physical motion may be implemented on the virtual space more accurately with a faster response speed.

Meanwhile, if the image sensor 120 is fixedly installed at the display apparatus 110 as in the embodiment of the present disclosure, it is enough if the image sensor 120 and the display apparatus 110 are just registered, and it is possible to eliminate any unnecessary process such as registering the image sensor 120 and the display apparatus 110 again at a service place.

The space registration method according to the present disclosure may be widely applied to a household virtual reality environment using a flat 3D display, a next-generation touch-type natural user interface (NUI), a virtual reality environment using a small home appliances such as a smart phone, or the like.

Even though embodiments of the present disclosure have been described in detail with reference to the accompanying drawings, the present disclosure is not limited thereto but may be modified in various ways within the scope of the present disclosure. Therefore, the embodiments of the present disclosure are not to limit the features of the present disclosure but to explain the same, and the scope of the present disclosure is not limited by the embodiments. Thus, it should be understood that the embodiments disclosed herein are just for illustrations only without limiting the present disclosure. The scope of the present disclosure should be interpreted by the appended claims, and all technical features equivalent thereto should be interpreted as falling into the scope of the present disclosure.

What is claimed is:

1. A space registration system for registration of a virtual space and a real space, the system comprising:

a display apparatus configured to output an image on a screen to form a virtual space;

an image sensor disposed at a location where the image output on the screen is not directly observed, to observe a real space facing the screen;

a processor configured to control the display apparatus and the image sensor; and a plane mirror disposed so that a display image, output on the screen, is reflected to a mirror surface as a reflection image and the reflection image is photographed by the image sensor so that the image sensor images the display image, wherein the photographed reflection image is used by the processor to determine a location and an angle of the plane mirror, the display apparatus, and the image sensor, wherein the display apparatus has a display coordinate system which defines a coordinate of the virtual space, and the image sensor has a sensor coordinate system which defines a coordinate of the real space, wherein the processor performs:
- obtaining a linear equation from the location and the angle information of the display apparatus, the image sensor and the plane mirror based on the reflection image photographed by the image sensor,
- using the linear equation, analogizing a transformation equation of the sensor coordinate system and the display coordinate system, using a symmetry of an incidence angle and a reflection angle of light with respect to the mirror surface, and calculating a coordinate of the reflection image with respect to the display coordinate system,
- transforming the coordinate of the reflection image with respect to the display coordinate system into a comparison coordinate, defined with respect to the sensor coordinate system, using the analogized transformation equation, and
- comparing the comparison coordinate with a reference coordinate, the reference coordinate being a known coordinate of the reflection image with respect to the sensor coordinate system, and adjusting the transformation equation of the sensor coordinate system and the display coordinate system to according to a squared difference between the comparison coordinate and the reference coordinate.

2. The space registration system according to claim 1, wherein the system comprises:

d number of display apparatuses configured to output an image on a screen to form a virtual space, d being a natural number of 1 or above; and c number of image sensors configured to observe a real space facing the screen, c being a natural number of 1 or above, wherein among the d number of display apparatuses, an $i^{th}$ display apparatus outputs an $i^{th}$ display image on the screen, i being an integer of 1 to d wherein the plane mirror is disposed so that the $i^{th}$ display image reflected to the mirror surface as an $i^{th}$ reflection image is photographed by a $j^{th}$ image sensor, j being an integer of 1 to c, among the c number of image sensors, wherein the $i^{th}$ display apparatus has an $i^{th}$ display coordinate system which defines a coordinate of the virtual space, and the $j^{th}$ image sensor has an $j^{th}$ sensor coordinate system which defines a coordinate of the real space, wherein a transformation equation of the $i^{th}$ display coordinate system and the $j^{th}$ sensor coordinate system is analogized, and a coordinate of the $i^{th}$ reflection image with respect to the $i^{th}$ display coordinate system is calculated, wherein the coordinate of the $i^{th}$ reflection image with respect to the $i^{th}$ display coordinate system is transformed into a i-j comparison coordinate p'ij, defined with respect to the $j^{th}$ sensor coordinate system, using the analogized transformation equation, and wherein the i-j comparison coordinate $p'_{ij}$ is compared with a i-j reference coordinate pij, the i-j reference coordinate pij being a known coordinate of the $i^{th}$ reflection image with respect to the $j^{th}$ sensor coordinate system, and the transformation equation of the $i^{th}$ display coordinate system and the $j^{th}$ sensor coordinate system is adjusted to minimize a difference thereof:
according to $$\sum_{i=0}^{D}\sum_{j=0}^{C}[p_{ij}-p'_{ij}]^2.$$

3. The space registration system according to claim 2, wherein the i-j comparison coordinate is compared with the i-j reference coordinate $p_{ij}$, and a transformation equation between display coordinate systems of the d number of display apparatuses is adjusted to minimize a difference thereof according to $$\sum_{i=0}^{D}\sum_{j=0}^{C}[p_{ij}-p'_{ij}]^2.$$

4. The space registration system according to claim 2, wherein the i-j comparison coordinate $p'_{ij}$ is compared with the i-j reference coordinate $p_{ij}$, and a transformation equation between sensor coordinate systems of the c number of image sensors is adjusted to minimize the difference according to $$\sum_{i=0}^{D}\sum_{j=0}^{C}[p_{ij}-p'_{ij}]^2.$$

5. A space registration method for registering a display coordinate system and a sensor coordinate system in an electronic device which includes a display apparatus configured to output an image on a screen to form a virtual space and an image sensor disposed at a location where the image output on the screen is not directly observed, to observe a real space facing the screen, the display apparatus having the display coordinate system which defines a coordinate of the virtual space, the image sensor having the sensor coordinate system which defines a coordinate of the real space, the method comprising:

(a) outputting a display image on the screen of the display apparatus;

(b) disposing a plane mirror at a predetermined location with a predetermined angle within a range which is capable of being photographed by the image sensor;

(c) by the image sensor, photographing the display image reflected to a mirror surface of the plane mirror as a reflection image so that the display image is imaged by the image sensor; determining, using a processor, a location and an angle of the plane mirror, the display apparatus, and the image sensor using the photographed reflection image;
(d) obtaining a linear equation from the location and the angle information of the display apparatus, the image sensor and the plane mirror based on the reflection image photographed by the image sensor,
using the linear equation, analogizing a transformation equation of the sensor coordinate system and the display coordinate system by means of symmetry of an incidence angle and a reflection angle of light with respect to the mirror surface, and calculating a coordinate of the reflection image with respect to the display coordinate system;
(e) transforming the coordinate of the reflection image with respect to the display coordinate system into a comparison coordinate, defined with respect to the sensor coordinate system, using the analogized transformation equation; and
(f) comparing the comparison coordinate with a reference coordinate, the reference coordinate being a known coordinate of the reflection image with respect to the sensor coordinate system, and adjusting the transformation equation of the sensor coordinate system and the display coordinate system according to a squared difference between the comparison coordinate and the reference coordinate.

6. The space registration method according to claim 5, wherein the electronic device includes d number of display apparatuses configured to output an image on a screen to form a virtual space, and c number of image sensors disposed at a location where the image output on the screen is not directly observed, to observe a real space facing the screen,
wherein among the d number of display apparatuses, an $i^{th}$ display apparatus has an $i^{th}$ display coordinate system which defines a coordinate of the virtual space, and among the c number of image sensors, a $j^{th}$ image sensor has an $j^{th}$ sensor coordinate system which defines a coordinate of the real space, i being an integer from 1 to d,
wherein the step (a) includes outputting an image as an $i^{th}$ display image on the screen of the $i^{th}$ display apparatus,
wherein the step (b) includes disposing the plane mirror at a predetermined location with a predetermined angle within a range which is capable of being photographed by the $j^{th}$ image sensor;
wherein the step (c) includes, by the $j^{th}$ image sensor, photographing the $i^{th}$ display image reflected to the mirror surface of the plane mirror as an $i^{th}$ reflection image,
wherein the method further comprises performing the steps (a) to (c) by the d number of display apparatuses and the c number of image sensors, respectively,
wherein the step (d) includes analogizing a transformation equation of the $j^{th}$ sensor coordinate system and the $i^{th}$ display coordinate system, and calculating a coordinate of the $i^{th}$ reflection image with respect to the $i^{th}$ display coordinate system,
wherein the step (e) includes transforming the coordinate of the $i^{th}$ reflection image with respect to the $i^{th}$ display coordinate system into a i-j comparison coordinate $p'_{ij}$, the i-j comparison coordinate $p'_{ij}$ being a coordinate with respect to the $j^{th}$ sensor coordinate system using the analogized transformation equation, and
wherein the step (f) includes comparing the i-j comparison coordinate $p'_{ij}$ with an i-j reference coordinate $p_{ij}$, the i-j reference coordinate $p_{ij}$ being a known coordinate of the $i^{th}$ reflection image with respect to the $j^{th}$ sensor coordinate system, and adjusting a transformation equation of the $i^{th}$ display coordinate system and the $j^{th}$ sensor coordinate system to minimize a difference thereof according to $$\sum_{i=0}^{D}\sum_{j=0}^{C}[p_{ij}-p'_{ij}]^2.$$

7. The space registration method according to claim 6, wherein the step (f) includes comparing the i-j comparison coordinate $p'_{ij}$ with the i-j reference coordinate $p_{ij}$, and adjusting a transformation equation between sensor coordinate systems of the c number of image sensors to minimize a difference thereof according to $$\sum_{i=0}^{D}\sum_{j=0}^{C}[p_{ij}-p'_{ij}]^2.$$

8. The space registration method according to claim 6, wherein the step (f) includes comparing the i-j comparison coordinate $p'_{ij}$ with the i-j reference coordinate $p_{ij}$, and adjusting a transformation equation between display coordinate systems of the d number of display apparatuses to minimize the difference according to $$\sum_{i=0}^{D}\sum_{j=0}^{C}[p_{ij}-p'_{ij}]^2.$$

9. The space registration method according to claim 6, wherein the step (c) is performed by simultaneously photographing d number of reflection images, respectively formed by the d number of display apparatuses, using the $j^{th}$ image sensor.

10. The space registration method according to claim 7, wherein the step (f) is performed by adjusting a transformation equation of the first display coordinate system and the $j^{th}$ sensor coordinate system and a transformation equation of the first display coordinate system and the $i^{th}$ display coordinate system, on the basis of the first display coordinate system.

11. The space registration method according to claim 5, wherein the display image comprises a lattice pattern.

12. An electronic device, comprising:
a display apparatus configured to output a display image on a screen to form a virtual space, the display apparatus having a display coordinate system which defines a coordinate of the virtual space; and
an image sensor disposed at a location where the image output on the screen is not directly observed, to observe a real space facing the screen, the image sensor having a sensor coordinate system which defines a coordinate of the real space,
wherein the electronic device is configured to perform;
(a) outputting the display image on the screen of the display apparatus;
(b) disposing a plane mirror at a predetermined location with a predetermined angle within a range capable of being photographed by the image sensor;

(c) by the image sensor, photographing the display image reflected to a mirror surface of the plane mirror as a reflection image so that the display image is imaged by the image sensor; determining, using a processor, a location and an angle of the plane mirror, the display apparatus, and the image sensor using the photographed reflection image;

(d) obtaining a linear equation from the location and the angle information of the display apparatus, the image sensor and the plane mirror based on the reflection image photographed by the image sensor, using the linear equation, analogizing a transformation equation of the sensor coordinate system and the display coordinate system by means of symmetry of an incidence angle and a reflection angle of light with respect to the mirror surface, and calculating a coordinate of the reflection image with respect to the display coordinate system, (e) transforming the coordinate of the reflection image with respect to the display coordinate system into a comparison coordinate, defined with respect to the sensor coordinate system, using the analogized transformation equation, and (f) comparing the comparison coordinate with a reference coordinate, the reference coordinate being a known coordinate of the reflection image with respect to the sensor coordinate system, and adjusting the transformation equation of the sensor coordinate system and the display coordinate system according to a squared difference between the comparison coordinate and the reference coordinate.

13. The electronic device according to claim 12, wherein the image sensor is fixed and coupled to the display apparatus.

14. The electronic device according to claim 12, wherein the display apparatus is a three-dimensional display apparatus capable of outputting a three-dimensional image.

15. The electronic device according to claim 12, wherein the image sensor is a RGBD sensor.

* * * * *